UNITED STATES PATENT OFFICE.

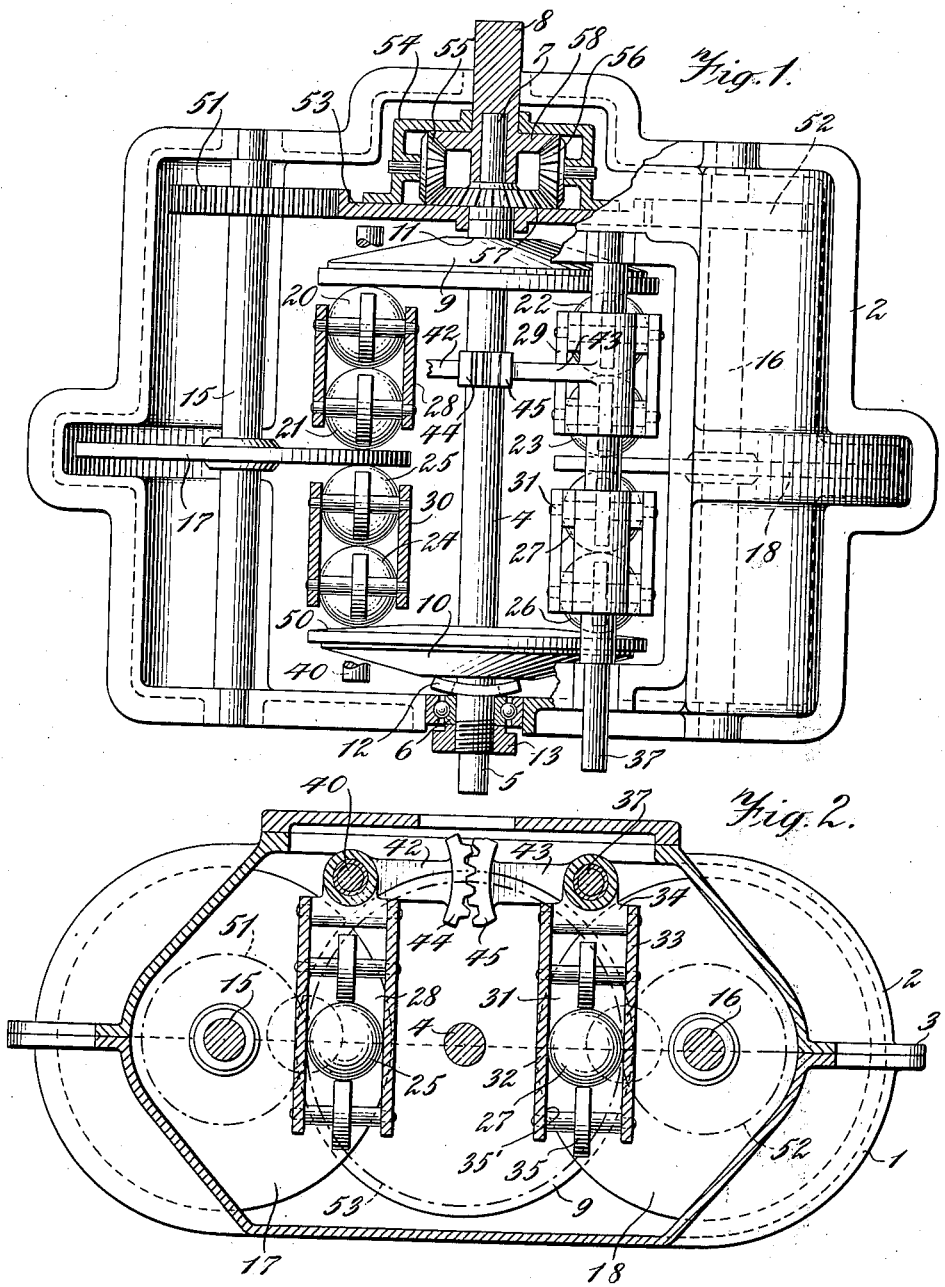

HANNIBAL C. FORD, OF NEW YORK, N. Y., ASSIGNOR TO FORD INSTRUMENT COMPANY, INC., A CORPORATION OF NEW YORK.

POWER TRANSMISSION.

1,415,164.  Specification of Letters Patent.  Patented May 9, 1922.

Application filed March 2, 1917. Serial No. 151,917.

*To all whom it may concern:*

Be it known that I, HANNIBAL C. FORD, a citizen of the United States, residing at the city of New York, in the borough of Queens and State of New York, have invented certain new and useful Improvements in Power Transmissions, of which the following is a full, clear, and exact description.

This invention relates to power transmissions and more particularly to power transmissions in which the speeds of the driving and driven elements may be varied at will.

One of the objects of the invention is to provide a transmission which is entirely mechanical and has its parts in continuous driving relation, while the relative speed of the driving and driven elements is being varied or the direction of rotation of the driven element is being reversed. Another object of the invention is to provide a transmission of this character in which the speed and direction of rotation of the driven element is controlled from a single point or actuating member.

A further object of the invention is to provide a power transmission in which the lateral thrusts upon the various parts of the transmission are equalized or balanced, and the end thrusts upon the different parts of the transmission are carried by the parts of the transmission and not transmitted to the casing which would render the use of thrust bearings or equivalent devices essential.

A still further object of the invention is to provide a power transmission which is composed of a plurality of separate power transmitting devices which are so associated with each other that they all co-operate with a main driving and driven element and thus distribute the load without causing an undue strain on any parts of the transmission. The invention also contemplates means whereby each of these separate power transmitting devices may be simultaneously controlled from a single actuating member.

With these and other objects in view, which will be apparent from the detailed description hereinafter to follow, the invention consists of the constructions and combinations which will be described and particularly pointed out in the claims.

In the accompanying drawings, one embodiment of the invention is shown which is intended to be illustrative of, and not as limiting, the invention, and Figure 1 shows a top plan view of a power transmission constructed in accordance with the principles of the invention, the upper half of the casing being removed to more clearly show the parts; and Figure 2 is a transverse section on the line 2—2 of Figure 1.

The power transmission shown in the drawings is adapted to be used for an automobile transmission or for any other desired purpose, and comprises a casing which is constructed in two halves 1 and 2, the sections of the casing having flanges which are secured together, as at 3. Mounted centrally within the casing is a shaft 4 which is the main driving shaft of the transmission, and is adapted to be secured at one end 5 to any suitable source of power, as, for example, the internal combustion engine of an automobile. This shaft is mounted at its one end in ball bearings 6, so that it can turn freely. Its other end 7 is of reduced diameter and is rotatably mounted within a centrally-disposed hole in the driven shaft 8 which is journalled in the casing.

Mounted on the shaft 4 are two disks 9 and 10, the disk 9 abutting against a shoulder 11 formed upon the shaft; and the disk 10 abutting against a spring washer 12, which in turn rests against the ring of the ball bearing 6. A nut 13 threaded upon the lower end 5 of the shaft 4 bears against the ball rings of the bearing 6 and adjusts the distance between the working surfaces of the disks 9 and 10. The spring washer 12 permits the disk 10 to yield slightly under pressure, the purpose of which will be later referred to. These disks 9 and 10 rotate with the shaft 4.

Mounted in parallel relation to the shaft 4 at each side thereof are auxiliary driving shafts 15 and 16, which shafts are journaled at their ends in the casing. The shafts 15 and 16 carry disks 17 and 18, which rotate therewith and are spaced substantially equidistant from the working surfaces of each of the disks 9 and 10.

Interposed between each of the intermediate disks 17 and 18, and the end disks 9 and 10, are a plurality of balls of relatively large size, which balls are in rolling contact with each other and with the working surfaces of the disks. These balls are the power transmitting medium between the disks. In the embodiment shown, a pair of balls are utilized between each pair of disks, the balls between the disks 9 and 17 being numbered 20 and 21; the balls between the disks 9 and 18, 22 and 23; the balls between the disks 10 and 17, 24 and 25; and the balls between the disks 10 and 18, 26 and 27. Each pair of balls is maintained one upon the other in driving relation by means of cages, the balls 20 and 21 by a cage 28, the balls 22 and 23 by a cage 29, the balls 24 and 25 by a cage 30, and the balls 26 and 27 by a cage 31. Each of these cages is of a similar construction and consists of two plates 32 and 33, (see Fig. 2) which plates are secured at one end to a block 34. Mounted between the plates are rollers 35 which have reduced ends providing shoulders 35' which abut against the plates to maintain them in spaced relation. Four of these rollers 35 are preferably provided for each cage, two of the rollers engaging each ball of a pair. The plates 32 and 33 also engage the balls and, with the rollers 35, provide a four point suspension for each ball which will prevent independent movement of the balls. The cages 29 and 31 are mounted upon a shaft 37 which passes through the blocks 34. The shaft 37 is suitably journalled at its ends in the upper half 2 of the casing, one end of the shaft extending beyond the casing and being adapted to be connected to any suitable mechanism for oscillating the same. In the same manner, the cages 28 and 30 are mounted upon a shaft 40 which is only indicated in Figure 1, which shaft is also mounted in the bearings in the upper half 2 of the casing.

Extending inwardly from the blocks 34 of the cages 28 and 31 are arms 42 and 43 which carry at their ends gear sectors 44 and 45 which mesh with each other so that any swinging movement of the shaft 37 will cause a corresponding movement of the shaft 40 in the opposite direction. In this manner, each of the cages 28, 29, 30 and 31 are connected for simultaneous movement to the shaft 37 so that they may be controlled by a single actuating member (not shown) to move them along the surfaces of the disks and thereby change the relative speed of the shaft 4 and the shafts 15 and 16. In the position of the balls shown, the points of contact of the balls with their respective disks is equi-distant from the centers of the shafts, and hence the shafts 4, 15 and 16 will rotate at the same speed. If, however, the shaft 37 is turned to swing the balls inwardly towards the shaft 4, the shafts 15 and 16 will then rotate at a slower speed than the shaft 4. When the shaft 37 is turned in the opposite direction to swing the balls outwardly, the shafts 15 and 16 will then rotate at a higher speed than the shaft 4. The relative speeds of the shafts 4 and the shafts 15 and 16 may therefore be varied at will.

By utilizing a pair of balls between two disks where power is to be transmitted from one disk to the other, the balls are free to move and will remain in rolling contact with the disks while the disks are rotating and the radial position of the balls is being changed by moving the shaft 37. The pressure between the disks and the balls need not, therefore, be released and yet the balls will move freely when a change in the relative speed of the driving and driven elements is desired. This permits relatively large pressures being placed upon the balls and disks to insure that they will remain in rolling contact and that no slipping will occur. This pressure is obtained in the present construction by adjusting the nut 13, for as will be clear from Figure 1, if the nut 13 is turned to force the disk 10 upwardly, the pressure between the balls and the disks may be increased to any desired extent. The spring washer 12 will, however, permit a slight yielding movement of the disk 10, which yielding movement is not, however, sufficient to decrease materially the pressure between the balls and the disks.

The disk 10 is shown as having a beveled working surface 50, the angle of which is exaggerated for the sake of clearness. The purpose of this construction is to increase the pressure on the balls at the low speeds of the shafts 15 and 16, for any inward movement of the balls will cause the balls 24 and 26 to be forced upwardly, which movement will, in turn, be imparted to the remaining balls and disks of the transmission to increase the pressures between them. In other words, the beveled surface 50 provides means for automatically increasing the pressure between the elements of the transmission in accordance with the relative speed of the shafts 4, 15 and 16.

The shafts 15 and 16 each carry at their upper ends gear wheels 51 and 52, respectively, which gear wheels mesh with a gear 53 which is loosely mounted upon the shaft 4. This gear wheel 53 carries a box or casing 54 in which beveled gears 55 and 56 are mounted, which beveled gears mesh with a gear 57 mounted on the shaft 4 for rotation therewith, and with a gear 58 which is mounted for rotation with the driven shaft or element 8. The gears 55, 56, 57 and 58 therefore form the usual type of differential gearing and any equivalent type of differential gearing may be used in lieu thereof.

From the construction shown, it is evident that since a pair of balls are interposed between the disks which are mounted upon the shafts 4, 15 and 16, the shafts 15 and 16 are rotated in an opposite direction to the shaft 4 whereby the gears 53 and 57 will rotate in the same direction. It will also be evident that since the beveled pinions 55 and 56 are mounted upon the gear 53, they are planetary gears which revolve about the axis of the gear 53 as a center, and also rotate upon their own axes when in mesh with the gears 57 and 58.

If, therefore, the gear 53 is rotating at half the speed of the gear 57, the driven element 8 remains at rest, the planetary pinions 55 and 56 revolving with this gear, and rotating idly on their own axes around the gear 57 without driving the gear 58. When, however, the controller shaft 37 is moved to cause the gear wheel 53 to be driven at a higher speed than one-half the speed of the gear 57, the driven element 8 will then rotate in the same direction as the shaft 4, and as the speed of the gear 53 is increased the speed of the driven element 8 will also be increased. The speed of the driven element 8 will be increased until the gear 53 is driven at the same speed as the gear 57, at which time the planetary pinions 55 and 56 will not rotate, but will serve as a direct and positive connection between the main driving shaft 4 and the driven shaft 8 which will therefore rotate at the same speed. On the other hand, if the controller shaft 37 is moved in the opposite direction so that the gear 53 is driven at less than one-half the speed of the gear 57, the driven element 8 will then be rotated in the opposite or reverse direction from the main driving shaft 4. The speed of the driven element in the reverse direction will be increased as the speed of the gear 53 is diminished.

It will, therefore, be seen that the differential shown connects the main shaft 4 to the driven shaft 8 in such a manner that while a friction drive is continuously established between the different parts of the mechanism, nevertheless the driven element may be rotated in the same or reverse direction to the main driving shaft which is rotatable in one direction only and at different speeds. This construction, therefore, gives the required speed changes and reversal of motion which are required for an automobile transmission or other power transmissions.

It should also be noted that all of these changes in speed are obtained without releasing the pressure between the balls and the disks, which remain at all times during the operation of the device in driving relation, and no clutches or other devices are necessary to release the pressures during the change of speed. Furthermore, all of the changes of speed are obtained by the actuation of the shaft 37, which, as before stated, is adapted to be connected up to an actuating member, such as a control lever, in a position to be readily manipulated by an operator.

From the construction described, it will also be seen that there are four separate power transmitting devices for transmitting power from the main driving shaft 4 to the driven shaft 8. These devices comprise the shaft 4, disk 9, balls 20 and 21, disk 17 and shaft 15; shaft 4, disk 9, balls 22 and 23, disk 18 and shaft 16; shaft 4, disk 10, balls 24 and 25, disk 17 and shaft 15; and shaft 4, disk 10, balls 26 and 27, disk 18 and shaft 16. Each of these transmitting devices or drives will carry an equal load; or in other words, none of the power transmitting balls will carry too heavy a load. Due to this distribution of the power the amount of pressure required upon each set of balls to prevent them from slipping is materially decreased. This distribution of the load is possible since each of these four separate power transmitting devices is interconnected to be simultaneously operated to vary the relative speeds of the main and auxiliary driving shafts.

It should also be noted that since the disks 9 and 10 are mounted upon a single shaft 4, this shaft will carry the load upon the shafts in a direction parallel to the axis of the shaft, and there are no end thrusts upon this shaft which would require end thrust bearings at the points of support of the shaft. Furthermore, the balls engaging the intermediate disks 17 and 18 are arranged so that they engage these disks at points on the opposed faces of the disks which are in direct alinement, and since the pressures exerted upon each face of the disk by these sets of balls are obviously equal, the disks 17 and 18 will not be subjected to any lateral thrust which would tend to twist their supporting shafts 15 and 16. The balls which engage the end disks 9 and 10 are also arranged so that they engage the disks at diametrically opposed points upon the working surfaces of these disks, and for this reason the disks 9 and 10 are not subjected to any lateral thrust which would tend to twist the shaft 4, but are subjected to a thrust of pressure which is at all times parallel to the axis of the shaft 4, which thrust, as has been already pointed out, is taken up by the shaft 4.

Various modifications of the structure shown may be made without departing from the spirit of the invention, and it is not the intention to limit this invention to the particular construction which has been described, but only by the scope of the claims appended hereto.

I claim:

1. A variable speed power transmission comprising a plurality of rotatable elements, a speed varying power transmitting device interposed between one of said elements and each of the other said elements for transmitting power from one element to the other, said power transmitting device being arranged to be in continuous rolling contact with and to engage diametrically opposed points on said one element to thereby equalize the lateral thrust thereon.

2. A variable speed power transmission comprising a rotatable element, a plurality of other rotatable elements, a speed varying power transmitting device interposed between said first named element and each of said other elements for transmitting power from one element to the other, said power transmitting devices being arranged to be in continuous rolling contact with and to engage diametrically opposed points upon said first named element to thereby equalize the lateral thrust thereon and means for simultaneously actuating said speed varying devices.

3. A variable speed power transmission comprising a rotatable element, a plurality of other rotatable elements, a speed varying power transmitting device between said first named element and each of the other elements, each of said devices having its parts in rolling contact with one another, and with the elements respectively, said devices being arranged to contact with said first named element at diametrically opposed points to thereby equalize the lateral thrust upon said element.

4. A variable speed power transmission comprising a rotatable element, a plurality of other rotatable elements and a set of balls interposed between said first named element and each of said other elements for transmitting power from one element to the other, the sets of balls being arranged to contact with said first named element at diametrically opposed points to thereby equalize the lateral thrust upon said first named element.

5. A variable speed power transmission comprising a pair of rotatable concentrically mounted disks, a plurality of rotatable disks mounted intermediate and eccentric to said first named pair of disks on opposite sides of their common axis and speed varying power transmitting devices between each one of said first named pair of disks and each of said intermediate disks for transmitting power from one of said disks to the other.

6. A variable speed power transmission comprising a pair of rotatable concentrically mounted disks, other rotatable disks mounted intermediate and eccentric to said first named pair of disks, speed varying power transmitting devices between each of said first named disks and each of said intermediate disks for transmitting power from one disk to the other, said power transmitting devices being arranged to equalize the lateral thrust on said pair of disks.

7. A variable speed power transmission comprising a pair of rotatable concentrically mounted disks, other rotatable disks mounted intermediate and eccentric to said first named pair of disks, speed varying power transmitting devices between each of said first named disks and each of said intermediate disks for transmitting power from one disk to another, said power transmitting devices being arranged to equalize the lateral thrust on said pair of disks, and said pair of disks being connected to take up the end thrusts thereon.

8. A variable speed power transmission comprising a pair of rotatable concentrically-mounted disks, other rotatable disks mounted intermediate and eccentric to said first named pair of disks bodily displaceable, variable speed power transmitting devices between each of said first named disks and each of said intermediate disks and in continuous rolling contact therewith, said power transmitting devices being arranged to equalize the lateral thrust on said pair of disks, said power transmitting devices engaging said intermediate disks at opposite points upon their opposed faces.

9. A variable power transmission comprising a shaft, a pair of disks mounted in spaced relation on said shaft, disks arranged on opposite sides of the shaft and intermediate said first named disks, and bodily displaceable speed varying power transmitting devices between each of said first named disks and said intermediate disks and in continuous rolling contact with said disks.

10. A variable speed power transmission comprising a shaft, a pair of disks mounted in spaced relation on said shaft, disks intermediate said first named disks and bodily displaceable speed varying power transmitting devices between each of said first named disks and said intermediate disks and in continuous rolling contact with said disks, said power transmitting devices being arranged to equalize the lateral thrust upon said pair of disks.

11. A variable speed power transmission comprising a shaft, a pair of disks mounted in spaced relation on said shaft, disks intermediate said first named disks and bodily displaceable speed varying power transmitting devices between each of said first named disks and said intermediate disks and in continuous rolling contact with said disks, said power transmitting devices being arranged to equalize the lateral thrust upon said pair of disks and to engage the opposed surfaces of said intermediate disks.

12. A power transmission comprising a shaft, a pair of disks mounted in spaced relation on said shaft, disks intermediate said pair of disks and eccentric thereto, and a plurality of sets of contacting balls in rolling contact with each of said pair of disks at diametrically opposite points and each of said intermediate disks.

13. A power transmission comprising a shaft, a pair of disks mounted in spaced relation on said shaft, disks intermediate said pair of disks and eccentric thereto, a plurality of contacting balls in rolling contact with each one of said pair of disks and each one of said intermediate disks, and means for simultaneously moving said balls.

14. A power transmission comprising a shaft, a pair of disks mounted in spaced relation on said shaft, disks intermediate said pair of disks and eccentric thereto, a plurality of contacting balls in rolling contact with each of said pair of disks and each of said intermediate disks, cages surrounding said balls, and means for simultaneously moving said cages.

15. A power transmission comprising two rotatable elements, a plurality of balls in rolling contact interposed between said elements, a cage surrounding said balls, said cage comprising two plates having two sets of rollers mounted between said plates, said balls engaging said rollers.

16. A power transmission comprising a pair of rotatable elements, a plurality of contacting balls interposed between said elements, a cage surrounding said balls, said cage being pivoted at one end, and means for swinging said cage on its pivot.

17. A power transmission comprising a rotatable element, a plurality of other rotatable elements, a set of contacting balls interposed between the first named element and each of said other elements, cages surrounding each set of balls, said cages being pivotally mounted at one end thereof, and means for causing a simultaneous swinging of said cages upon their pivots.

18. A power transmission comprising a rotatable element, a plurality of other rotatable elements, a set of contacting balls interposed between the first named element and each of said other elements, cages surrounding each set of balls, said cages being mounted on rotatable shafts, and means for causing a simultaneous swinging of said shafts, said means comprising gearing connecting the shafts.

19. A variable speed power transmission comprising a casing, a plurality of shafts rotatably mounted on said casing, disks mounted on said shafts, a bodily displaceable speed varying power transmitting device interposed between each pair of disks and in continuous rolling contact with said disks, said devices being arranged diametrically opposed to equalize the lateral and end thrust imparted to said disks by said power transmitting devices.

20. A power transmission comprising a driven element, a driving element rotatable in one direction and mechanical mechanism interposed between said driving and driven elements for driving said driven element in a forward or reverse direction and at variable speeds, including a single bodily movable unit having rolling contact with said driving element in its direction of rotation and at substantially right angles thereto.

21. A power transmission comprising a driven element, a driving element rotatable in one direction and mechanical mechanism for driving said driven element at variable speeds in a forward or reverse direction, including a part having rolling contact with said driving element in its direction of rotation and at substantially right angles thereto.

22. A variable speed power transmission comprising a driven element, a driving element rotatable in one direction, and mechanical mechanism having its speed controlling parts in continuous driving relation with said driving and driven elements for imparting rotation to said driven elements at variable speeds and in different directions, said speed controlling parts being freely movable while the elements are in rotation or at rest.

23. A variable speed power transmission comprising a driven element, a main driving element, an auxiliary driving element, differential gearing connecting said main and auxiliary driving elements to said driven element and means including a part having a rolling contact with the main driving element in all directions for varying the relative speeds of said main and auxiliary driving elements to drive said driven element in either direction and at variable speeds.

24. A variable speed power transmission comprising a pair of rotatable concentrically-mounted disks, a plurality of rotatable disks mounted intermediate and eccentric to said first named pair of disks, bodily movable speed varying power transmitting devices between each one of said first named pair of disks and each of said intermediate disks and in continuous rolling contact with said disk, and means for simultaneously moving said power transmitting devices.

25. A variable speed power transmission comprising a shaft, a pair of disks mounted in spaced relation on said shaft, disks intermediate said first named disks, bodily movable speed varying power transmitting devices between each of said first named disks and said intermediate disks and in continuous rolling contact with said disks and means for simultaneously controlling said power transmitting devices.

In witness whereof, I subscribe my signature.

HANNIBAL C. FORD.